United States Patent [19]

Hirota et al.

[11] Patent Number: 5,239,826
[45] Date of Patent: Aug. 31, 1993

[54] EXHAUST SYSTEM FOR ENGINE

[75] Inventors: Tomotaka Hirota; Hisashi Sera, both of Hiroshima, Japan

[73] Assignee: Mazda Motor Corporation, Hiroshima, Japan

[21] Appl. No.: 853,602

[22] Filed: Mar. 18, 1992

[30] Foreign Application Priority Data

Mar. 20, 1991 [JP] Japan .................. 3-057135

[51] Int. Cl.⁵ .............................................. F01N 3/28
[52] U.S. Cl. ...................................................... 60/302
[58] Field of Search ............................................ 60/302

[56] References Cited

U.S. PATENT DOCUMENTS 4,653,270 3/1987 Takii ...................................... 60/302
4,887,427 12/1989 Shinzawa ............................ 60/302

FOREIGN PATENT DOCUMENTS 31218 3/1977 Japan ..................................... 60/302

Primary Examiner—Douglas Hart
Attorney, Agent, or Firm—Keck, Mahin & Cate

[57] ABSTRACT

An exhaust system for an engine having two groups of cylinders includes a small capacity catalytic converter disposed in an exhaust manifold for one group of cylinders and a larger capacity catalytic converter disposed in an exhaust manifold for another group of cylinders. The exhaust system also includes a primary catalytic converter, having a capacity larger than both the small and larger catalytic converters, disposed in an exhaust pipe commonly connected to the exhaust manifolds.

12 Claims, 3 Drawing Sheets

EXHAUST SYSTEM FOR ENGINE

BACKGROUND OF THE INVENTION

1. Field of the Invention

The present invention is concerned with an improved exhaust system used with an internal combustion engine. More specifically, the present invention is concerned with an exhaust system which has at least one catalytic device included in or attached to it for reducing harmful emissions or purifying engine exhaust gases.

2. Description of Related Art

Known exhaust systems for internal combustion engines, which discharge engine exhaust gases into the atmosphere, are typically endowed with catalytic devices which reduce harmful emissions or purify exhaust gases. One such catalytic device and engine arrangement is known from, for example, Japanese Unexamined Patent Publication 63-102,922. In the arrangement described in this publication, the exhaust system has a plurality of catalytic convertors provided for each row of engine cylinders. With regard to the capacity of the catalytic device which is located farthest upstream, i.e., closest to the engine, the lengths of the exhaust passage between each row of air pipes and each catalytic device is arranged so that they vary from the longest to the shortest. When this construction is used, after the engine is started, the temperature of each catalytic device, starting from that catalytic device which is the farthest upstream, is increased until it reaches a gas purifying temperature an operational temperature) without any great delay. At the gas purifying or operational temperature, a specific level of gas purification is demonstrated.

The known exhaust system of the Japanese publication mentioned above, however, needs a long time after operation of the engine starts before purification of exhaust gases begins. In particular, while the engine is cold and until the engine has been adequately heated up, purification of exhaust gases is insufficiently performed.

SUMMARY OF THE INVENTION

It is an object of the present invention to provide an exhaust system which performs improved exhaust gas purification even prior to heating up of an engine and while the engine is still cold.

This object is accomplished by providing a particularly constructed exhaust system for an automobile internal combustion engine in which a plurality of cylinders are divided into two groups. The exhaust system has an exhaust pipe means for carrying engine exhaust to a rear of the vehicle. The exhaust system includes an exhaust manifold having upstream exhaust pipe portions connected to exhaust ports of each of the two groups of cylinders and a common downstream pipe portion with which the upstream exhaust pipe portions merge together. An exhaust pipe is connected to both of the common downstream pipe portions for the two groups of cylinders. The exhaust system is endowed with a pre-positioned exhaust gas purification device, such as a catalytic converter, disposed in the common downstream pipe portion of each exhaust manifold and a primary exhaust gas purification device, such as a catalytic converter, disposed in the exhaust pipe. These two pre-positioned exhaust gas purification devices are different in capacity; one of the pre-positioned exhaust gas purification devices has a larger capacity than the other. The primary exhaust gas purification device, moreover, has a larger capacity than both of the two pre-positioned exhaust gas purification devices. That pre-positioned exhaust gas purification device which has a smaller capacity than the other pre-positioned exhaust gas purification device is located where it is more exposed to an air stream, produced while the vehicle is traveling, than the other pre-positioned exhaust gas purification device.

The two pre-positioned exhaust gas purification devices are preferably disposed on opposite sides of an engine, if the engine is a "V-type" engine, or side by side on the same side of an engine, if the engine is an "in-line" type. Specifically, if a V-type engine is mounted with its crankshaft directed perpendicularly to a lengthwise direction of the vehicle, the pre-positioned exhaust gas purification device, having a smaller capacity than the other pre-positioned exhaust gas purification device, is disposed on the rear of the V-type engine. Alternatively, if a V-type engine is mounted with its crankshaft directed in a lengthwise direction of the vehicle, the pre-positioned exhaust gas purification device, having a smaller capacity than the other pre-positioned exhaust gas purification device, is disposed behind a supplemental apparatus, disposed in front of the engine. If an in-line type engine is mounted with its crankshaft directed perpendicularly to a lengthwise direction of the vehicle, the two pre-positioned exhaust gas purification devices are disposed on the front side of the in-line engine. Also, the pre-positioned exhaust gas purification device, having a smaller capacity than the other pre-positioned exhaust gas purification device, is disposed behind a supplemental apparatus cooperating with and disposed in front of the engine. Otherwise, if an in-line type engine is mounted with its crankshaft directed in a lengthwise direction of the vehicle, the pre-positioned exhaust gas purification device, having a smaller capacity than the other pre-positioned exhaust gas purification device, is disposed behind the other pre positioned exhaust gas purification device.

In the exhaust system of the present invention, after the engine has been started and is operating, the pre-positioned exhaust gas purification device which has a smaller capacity reaches a predetermined temperature at which the highest level of exhaust gas purification is expected. Then, the pre-positioned exhaust gas purification device having a larger capacity reaches the purification temperature. Finally, the primary exhaust gas purification device attains the purification temperature. In this instance, the pre-positioned exhaust gas purification device having the smallest capacity reaches the purification temperature faster than when all of the exhaust gas purification devices are of uniform capacity. Consequently, purification of exhaust gases commences at an earlier time after starting the engine. In addition, because exhaust gases passing through the two pre-positioned exhaust gas purification devices attain a high temperature earlier, the primary exhaust gas purification device will also reach the purification temperature faster. As a result, purification of exhaust gases, before the engine has completely warmed up, i.e., while it is still cold, is improved.

BRIEF DESCRIPTION OF THE DRAWINGS

The above and other objects and features of the present invention will be apparent to those skilled in the art from the following description of preferred embodiments thereof when considered in conjunction with the accompanying drawings, wherein similar reference numerals have been used to designate the same or similar elements throughout the drawings, and in which.

DETAILED DESCRIPTION OF THE PREFERRED EMBODIMENTS

Figure 1:
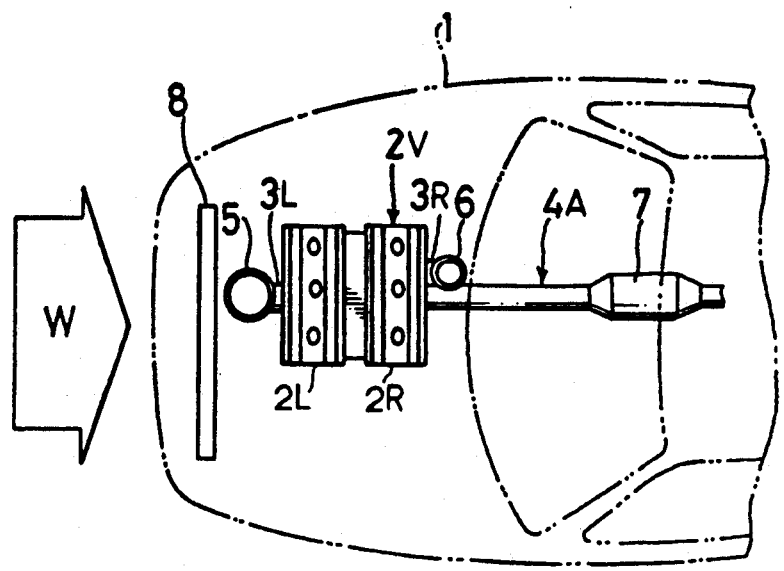
FIG. 1 is a schematic plan view of an exhaust system in accordance with a preferred embodiment of the invention which is combined with a V-type, transversely oriented engine.
Figure 2:
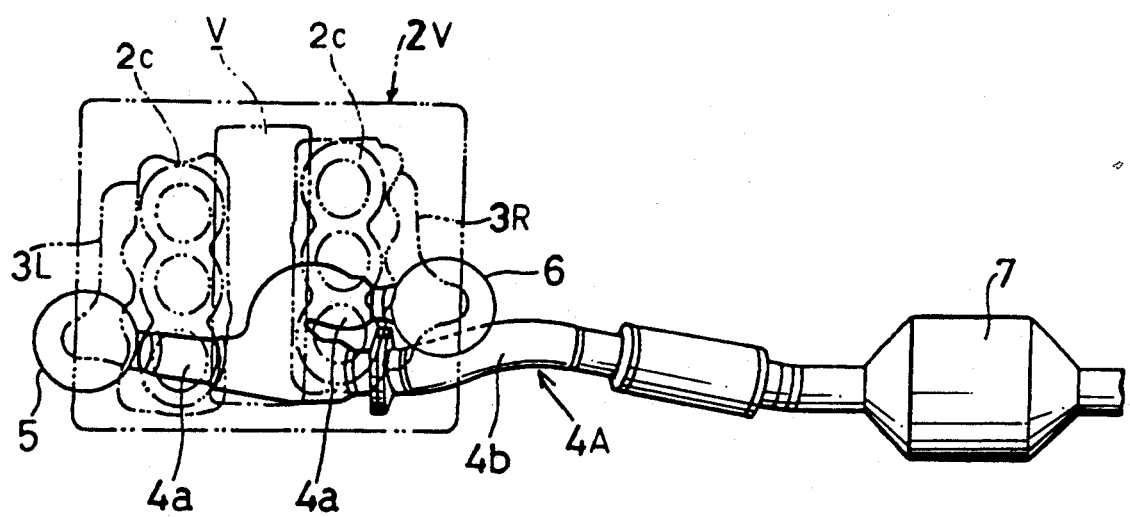
FIG. 2 is an enlarged plan view of the exhaust system shown FIG. 1.
Figure 3:
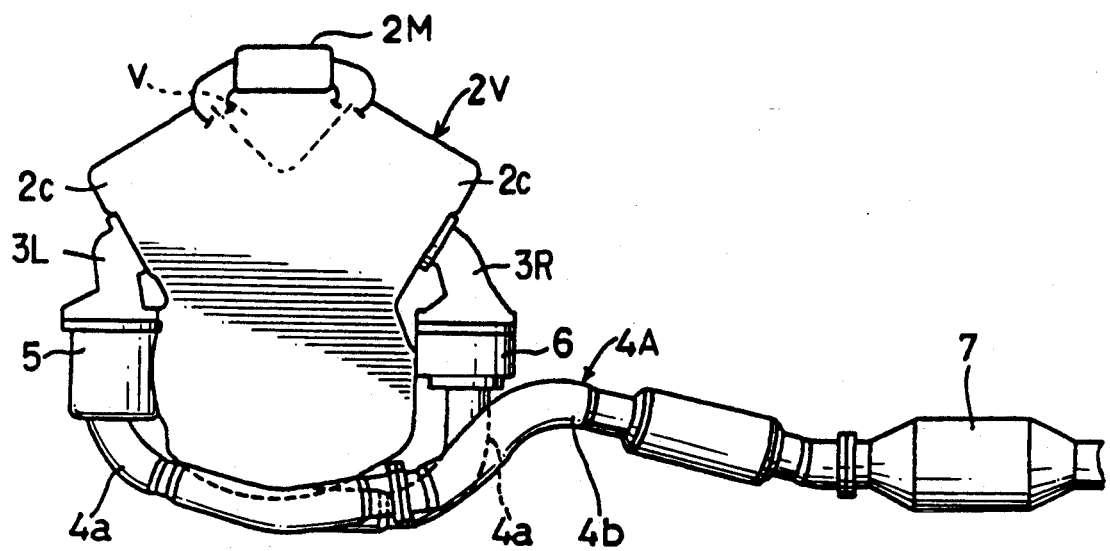
FIG. 3 is an enlarged frontal view of the exhaust system shown in FIG. 1.

Referring to the drawings and, in particular, to FIGS. 1 to 3, the front section or engine room 1 of an automotive vehicle body is shown. In the front section or engine room 1, an engine 2V, equipped with an exhaust pipe system 4A in accordance with a preferred embodiment of the present invention, is transversely mounted behind a radiator 8. The engine 2V, which may be, for example, a V-type, 6-cylinder engine, is transversely mounted in the engine room 1. The engine 2V includes first and second, or left and right, cylinder banks 2L and 2R, arranged in a V-formation. The first and second cylinder banks have a preferred relative angle of, for example, about 60 degrees therebetween. Each cylinder bank 2L or 2R is formed with a row of cylinders 2C parallel to a lengthwise direction of the vehicle body. In or above a V-shaped space V, formed between the left and right cylinder banks 2L and 2R of the engine 2V, an intake manifold 2M, well known in the art, is disposed. The engine 2V further has an exhaust pipe system 4A attached to it. The exhaust pipe system 4A includes exhaust manifolds 3L and 3R, pre-positioned catalytic devices, such as catalytic converters 5 and 6, an upstream branch exhaust pipe 4a, a downstream exhaust pipe 4b, and a primary catalytic device, such as a catalytic converter 7. The exhaust manifold 3L for the row of cylinders 2c of the left cylinder bank 2L is attached directly to the front, or left, side of the left cylinder bank 3L, remote from the V-shaped space V. Similarly, the exhaust manifold 3R for the row of cylinders 2C of the right cylinder bank 2R is attached directly to the rear, or right, side of the right cylinder bank 3R, remote from the V-shaped space V. The left exhaust manifold 3L is connected to one of the branches of the upstream branch exhaust pipe 4a, branching off from the downstream portion of the upstream branch exhaust pipe 6a, through the pre-positioned catalytic converter 5. Similarly, the right exhaust manifold 3R is connected to another of the branches of the upstream branch exhaust pipe 6a, branching off from the downstream portion of the upstream branch exhaust pipe 6a, through the pre-positioned catalytic converter 6, which has a smaller capacity than that of pre-positioned catalytic converter 5. The upstream branch exhaust pipe 6a is connected to the downstream exhaust pipe 4 which extends under the vehicle body 1 toward the rear of the vehicle body 1 along approximately a lengthwise center line of the vehicle body. A primary catalytic device, such as a catalytic converter 7, which has a larger capacity than that of large pre-positioned catalytic converter 5, is disposed in the downstream exhaust pipe 4a. For example, in this embodiment, the catalytic converters 5, 6 and 7 are designed to have capacities of 0.7 liters, 0.5 liters and 1.5 liters, respectively. Each of the catalytic converters 5, 6 and 7 may be of any type well known in the art and serves efficiently to reduce or remove harmful emissions in the exhaust gases after reaching a predetermined purification temperature.

With the exhaust system thus constructed, after starting the engine 2V, since the small pre-positioned catalytic converter 6 has a smaller capacity than that of the pre-positioned large catalytic converter or device 5 and is blocked, by the engine 2V, from exposure to air stream W while the vehicle is traveling, it reaches the predetermined purification temperature before the other two catalytic converters. The large pre-positioned catalytic device 5 reaches the predetermined purifying temperature after the small pre-positioned catalytic converter 6. Because it has the largest capacity of the three catalytic converters or devices and because its location is downstream from both of the pre-positioned catalytic converters 5 and 6, the primary catalytic converter 7 reaches the purification temperature last. All of the catalytic converters 5, 6 and 7 reach a purifying temperature more quickly than if the pre-positioned catalytic converters 5 and 6 were to have the same capacity and the pre-positioned large catalytic converter 5, the pre-positioned catalytic converter 6 and the primary catalytic converter 7 were to be provided in positions where they would be equally exposed to an air stream while the vehicle is traveling. Consequently, catalytic converters 5, 6 and 7 begin purification of exhaust gases at an earlier time after starting the engine. In addition, the primary catalytic converter 7 reaches the purifying temperature at an earlier time because of a prior increase in the temperature of exhaust gases, which have already passed through the small pre-positioned catalytic converter 6. The small pre-positioned catalytic converter 6 itself has sustained an early increase in temperature, before the primary catalytic device 7. This results in all of the catalytic converters 5, 6 and 7 showing, as a whole, an improvement in gas purification while the engine 2V is still cold or before the engine is sufficiently heated up.

Figure 4:
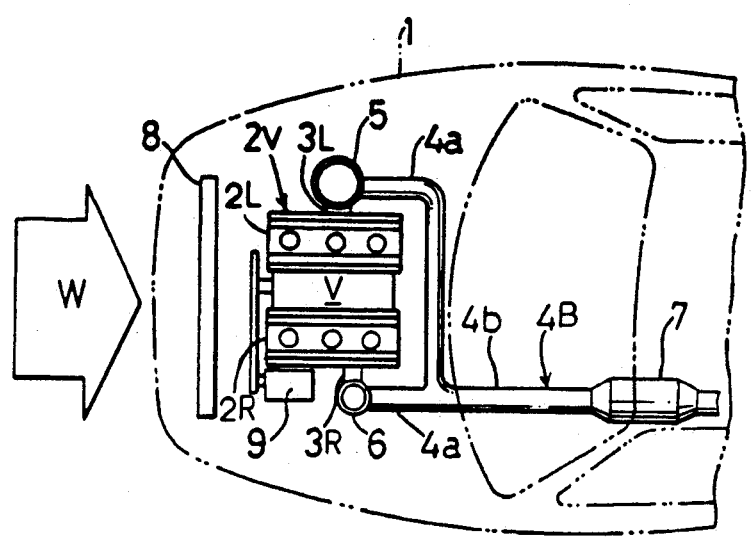
FIG. 4 is a schematic plan view of an exhaust system in accordance with another preferred embodiment of this invention which is combined with a V-type, lengthwise oriented engine.
Figure 5:
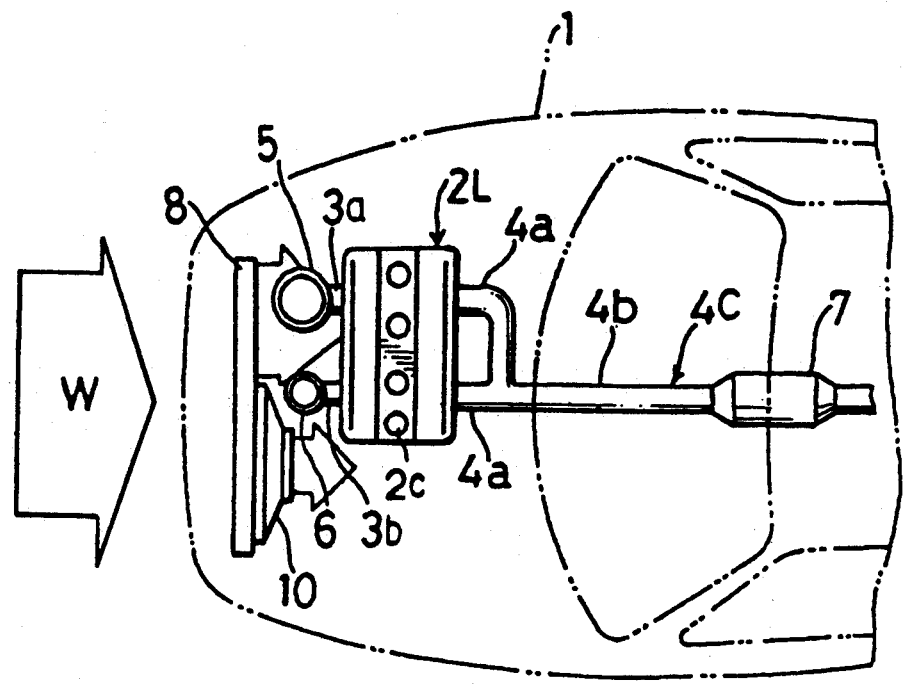
FIG. 5 is a schematic plan view of an exhaust system in accordance with still another preferred embodiment of this invention which is combined with an in-line, transversely oriented engine.
Figure 6:
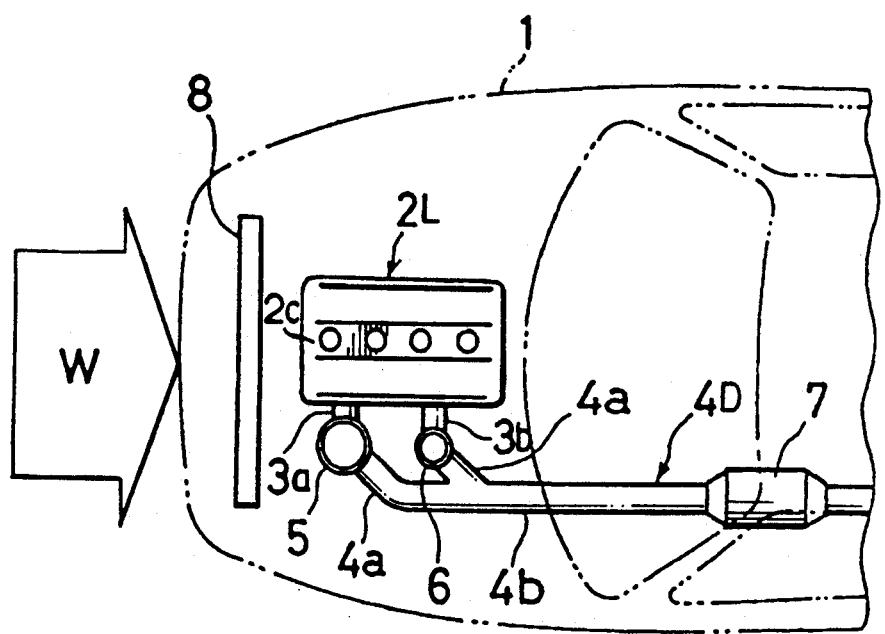
FIG. 6 is a schematic plan view of an exhaust system in accordance with a further preferred embodiment of this invention which is combined with an in-line, lengthwise oriented engine.

The exhaust pipe system 4A of the present invention may be modified according to engine arrangements and/or engine types as shown in FIGS. 4 to 6.

Because all elements or components of the exhaust system in the following modifications are essentially the same in function as those of the previous embodiment, the following description will be directed simply to the arrangement of elements in the exhaust pipe system.

Referring to FIG. 4, the front section or engine room 1 of an automotive vehicle body, in which a V-type, 6-cylinder internal combustion engine 2V is equipped with an exhaust pipe system 4B in accordance with a preferred embodiment of the present invention, is shown.

The engine 2V is mounted, behind a radiator 8, in a lengthwise direction of the vehicle body in the engine room 1 so as to place cylinder banks 2L and 2R parallel to the lengthwise direction of the vehicle body. The engine 2V has an exhaust pipe system 4B attached to it. The exhaust pipe system includes exhaust manifolds 3L and 3R, pre-positioned catalytic devices, such as catalytic converters 5 and 6, an upstream branch exhaust pipe 4a, a downstream exhaust pipe 4b and a primary catalytic device, such as a catalytic converter 7. The exhaust manifold 3L for a row of cylinders (not shown) of the left cylinder bank 2L is attached directly to the left side of the left cylinder bank 3L, remote from the V-shaped space V. Similarly, the exhaust manifold 3R for a row of cylinders (not shown) of the right cylinder bank 2R is attached directly to the right side of the right cylinder bank 2R, remote from the V-shaped space V. The left exhaust manifold 3L is connected to one of branches of the upstream branch exhaust pipe 4a, branching off from the downstream portion of the upstream branch exhaust pipe 4a, through the large pre-positioned catalytic converter 5. Similarly, the right exhaust manifold 3R is connected to another of the branches of the upstream branch exhaust pipe 4a, branching off from the downstream portion of the upstream branch exhaust pipe 4a, through the small pre-positioned catalytic converter 6, which has a smaller capacity than that of the pre-positioned catalytic converter 5. The upstream branch exhaust pipe 4a is connected to the downstream exhaust pipe 4b which extends under the vehicle body 1 toward the rear of the vehicle body 1, along approximately a straight line extending lengthwise of the vehicle body 1, beside the right cylinder bank 3R. A primary catalytic device, such as a catalytic converter 7, which has a larger capacity than that of the large pre-positioned catalytic converter 5, is disposed in the downstream exhaust pipe 4a. The engine 2V is provided with a supplemental apparatus 9, such as a hydraulic pump of a power steering unit, cooperating with the engine 2V. The supplemental apparatus 9 is disposed beside the front portion of the engine 2 so as to hide the small pre-positioned catalytic converter 6 behind it.

When the exhaust pipe system 4B is constructed in this way, after the engine 2V has started, the small pre-positioned catalytic converter 6, the large pre-positioned catalytic converter 5 and the primary catalytic converter 7, in that chronological order, reach the predetermined purification temperature. Because the small pre-positioned catalytic converter 6 has a capacity which is smaller than that of the large pre-positioned catalytic converter 5, and is blocked from exposure to air stream W by the supplemental apparatus 9 disposed beside the front portion of the engine 2V, as in the previous embodiment, the purification temperature is reached early on. As a result, the exhaust pipe system commences purification of exhaust gases soon after starting the engine 2V and prior to complete heating u of the engine 2V.

Referring to FIG. 5, the front section or engine room 1 of an automotive vehicle body, in which an in-line, 4-cylinder internal combustion engine 2L is equipped with an exhaust pipe system in accordance with a preferred embodiment of the present invention, is shown.

The engine 2L is mounted, behind a radiator 8, in a transverse direction of the vehicle body in the engine room 1 so that its row of cylinders 2c is aligned perpendicularly to the lengthwise direction of the vehicle body. The engine 2L is attached with an exhaust pipe system 4C, which includes two, i.e., first and second, exhaust manifolds 3a and 3b, pre-positioned catalytic devices, such as catalytic converters 5 and 6, an upstream branch exhaust pipe 4a, a downstream exhaust pipe 4b and a primary catalytic device, such as a catalytic converter 7. The exhaust manifolds 3a and 3b are, respectively, assigned to first and second groups of cylinders into which the row of cylinders 2C is divided. The first exhaust manifold 3a for the first group of cylinders is attached directly to the front side of the engine 2L, facing the radiator 8. Similarly, the second exhaust manifold 3b for the second group of cylinders is disposed side by side in the transverse direction, but separately from the first exhaust manifold 3a, and is attached directly to the same front side of the engine 2L as that to which the first exhaust manifold 3a is attached. The first exhaust manifold 3a is connected to one of the branches of the upstream branch exhaust pipe 4a, branching off from the downstream portion of the upstream branch exhaust pipe 4a, through the pre-positioned catalytic converter 5. The pre-positioned catalytic converter 5 has a larger capacity than the pre-positioned catalytic converter 6. Similarly, the second exhaust manifold 3b is connected to another of the branches of the upstream branch exhaust pipe 4a, branching off from the downstream portion of the upstream branch exhaust pipe 4a, through the pre-positioned catalytic converter 6, which has a smaller capacity than that of the pre-positioned catalytic converter 5. One of the branches of the upstream branch exhaust pipe 4a, for example, the branch attached to the large pre-positioned catalytic converter 5, is longer in length than the branch attached to the small pre-positioned catalytic converter 6. The upstream branch exhaust pipe 4a is connected to the downstream exhaust pipe 4b which extends under the vehicle body 1 toward the rear of the vehicle body 1 along approximately a lengthwise center line of the vehicle body 1. A primary catalytic device, such as a catalytic converter 7, which has a larger capacity than that of the large pre-positioned catalytic converter 5, is disposed in the downstream exhaust pipe 4a. The small pre-positioned catalytic converter 6 is in a location behind a cooling fan cover 10 where it is not easily exposed to an air stream W caused while the vehicle is traveling.

In an exhaust pipe system 4C constructed in this way, after starting the engine 2L, the small pre-positioned catalytic converter 6, the large pre-positioned catalytic converter 5 and the primary catalytic converter 7, in that order, reach the purification temperature. Because the small pre-positioned catalytic converter 6 is smaller in capacity than the large pre-positioned catalytic converter 5 and is blocked from the air stream W by the cooling fan cover 10, the small pre-positioned catalytic converter 6 quickly achieves the purification temperature first, in the same way as the construction of the previous embodiment. Consequently, the purification of exhaust gases by the exhaust pipe system 4C commences shortly after starting the engine 2L. The catalytic converters 5, 6 and 7, as a whole, have an improved purifying function even prior to heating up of the engine 2L and while it is cold.

Referring to FIG. 6, the front section or engine room 1 of an automotive vehicle body, in which an in-line, 4-cylinder internal combustion engine 2L is equipped with an exhaust pipe system in accordance with a preferred embodiment of the present invention, is shown.

The engine 2L is mounted, behind a radiator 8, in a lengthwise direction of the vehicle body in the engine room 1 so as to align a row of cylinders 2c perpendicularly to the lengthwise direction of the vehicle body. The engine 2L has, at one side, an exhaust pipe system 4D attached to it, similarly to the exhaust pipe system 4C shown in FIG. 5. However, in the embodiment shown in FIG. 6, the arrangement of large and small pre-positioned catalytic converters 5 and 6 is different. That is, the large pre-positioned catalytic converter 5 is aligned with and separate from the small pre-positioned catalytic converter 6 in the lengthwise direction. Specifically, the small pre-positioned catalytic converter 6 is hidden behind the large pre-positioned catalytic converter 5. The branch exhaust pipes 4a connected to the small pre-positioned catalytic converter 6 are shorter in length than the branch exhaust pipes 4a connected to the large pre-positioned catalytic converter 5.

In an exhaust pipe system constructed in this way, after starting the engine, the small pre-positioned catalytic converter 6, the large pre-positioned catalytic device 5 and the primary catalytic converter 7 reach the purification temperature, in that chronological order. As the temperatures of these catalytic converters rise, because the small pre-positioned catalytic converter 6 has a smaller capacity than the large pre-positioned catalytic converter 5, and is blocked, by the large pre-positioned catalytic converter 5, from exposure to an air stream W, the small pre-positioned catalytic converter 6 reaches the purifying temperature earlier than the other catalytic converters, in the same manner as in the embodiment shown in FIG. 1. In addition, since the pipe length from the small catalytic converter 6 to the convergence of both branch exhaust pipes 4a and 4a is shorter than the pipe length from the large pre-positioned catalytic converter 5 to the convergence of the branch exhaust pipes, resulting in little reduction in the temperature of exhaust gases between the small pre-positioned catalytic converter 6 and the primary catalytic converter 7, the temperature of the primary catalytic converter 7 is increased in a shortened time. Consequently, the exhaust pipe system 4C begins purification of exhaust gases soon after starting the engine. The catalytic converters 5, 6 and 7, as a whole, have an improved exhaust gas purification even prior to the heating up of engine 2L, i.e., while the engine is still cold.

It is to be understood that although the present invention has been described in detail with respect to preferred embodiments thereof, various other embodiments and variants which fall within the spirit and scope of the invention may occur to those skilled in the art. Any such other embodiments and variants are intended to be covered by the following claims.

What is claimed is:

1. An exhaust system for an internal combustion engine for an automotive vehicle, said engine having a plurality of cylinders which are divided into two groups, said exhaust system comprising:
   exhaust pipe means for carrying engine exhaust toward a rear of said vehicle, said exhaust pipe means including at least one exhaust manifold, upstream exhaust pipe portions connected to exhaust ports of each group of cylinders, a common downstream pipe portion to which said upstream exhaust pipe portions are connected together, and an exhaust pipe connected to said common downstream pipe portion;
   a small catalytic converter disposed in one of said upstream exhaust pipe portions of said at least one exhaust manifold;
   a larger catalytic converter, having a capacity larger than said small catalytic converter, disposed in another of said upstream exhaust pipe portions, and
   a primary catalytic converter disposed in said exhaust pipe, wherein said larger catalytic converter is more exposed to an air stream while the vehicle is travelling than said small catalytic converter.

2. An exhaust system as recited in claim 1, and further comprising a primary catalytic converter disposed in said exhaust pipe.

3. An exhaust system as recited in claim 2, wherein said primary catalytic converter has a capacity larger than the capacity of said larger catalytic converter.

4. An exhaust system as recited in claim, wherein said small catalytic converter and said larger catalytic converter are disposed on opposite sides of said internal combustion engine, and said small catalytic converter is disposed on one of said opposite sides which is less exposed to an air stream, produced while said vehicle is traveling, than another of said opposite sides.

5. An exhaust system as recited in claim 4, wherein said small catalytic converter is disposed on a rear side of said internal combustion engine which has its crankshaft directed perpendicularly to a lengthwise direction of said vehicle.

6. An exhaust system as recited in claim 5, wherein said internal combustion engine is a V-type, multi-cylinder engine having two rows of cylinders, both of which are parallel to said crankshaft.

7. An exhaust system for an internal combustion engine for an automotive vehicle, said engine having a plurality of cylinders which are divided into two groups, said exhaust system comprising:
   exhaust pipe means for carrying engine exhaust toward a rear of said vehicle, said exhaust pipe means including at least one exhaust manifold, upstream exhaust pipe portions connected to exhaust ports of each group of cylinders, a common downstream pipe portion to which said upstream exhaust pipe portions are connected together, and an exhaust pipe connected to said common downstream pipe portions;
   a small catalytic converter disposed in one of said upstream exhaust pipe portions of said at least one exhaust manifold; and
   a larger catalytic converter, having a capacity larger than said small catalytic converter, disposed in another of said upstream exhaust pipe portions,
   wherein said small catalytic converter is disposed behind a supplemental apparatus disposed on a side of said internal combustion engine, said internal combustion engine having its crankshaft directed parallel to a lengthwise direction of said vehicle, said supplemental apparatus cooperating with said internal combustion engine.

8. An exhaust system as recited in claim 7, wherein said internal combustion engine is a V-type, multi-cylinder engine having two rows of cylinders, both of which are parallel to said crankshaft.

9. An exhaust system for an internal combustion engine for an automotive vehicle, said engine having a plurality of cylinders which are divided into two groups, said exhaust system comprising:
   exhaust pipe means for carrying engine exhaust toward a rear of said vehicle, said exhaust pipe means including at least one exhaust manifold, upstream exhaust pipe portions connected to exhaust ports of each group of cylinders, a common downstream pipe portion to which said upstream exhaust pipe portions are connected together, and an exhaust pipe connected to said common downstream pipe portion;

a small catalytic converter disposed in one of said upstream exhaust pipe portions of said at least one exhaust manifold; and a larger catalytic converter, having a capacity larger than said small catalytic converter, disposed in another of said upstream exhaust pipe portions, wherein said small catalytic converter is disposed so as to be less exposed to an air stream, produced while said vehicle is traveling, than said larger catalytic converter, said small and said larger catalytic converters are disposed side by side on a front side of said internal combustion engine, said internal combustion engine has its crankshaft directed perpendicularly to a lengthwise direction of said vehicle, and said small catalytic converter is disposed behind a supplemental apparatus disposed in front of said front side of said internal combustion engine.

10. An exhaust system as recited in claim 9, wherein said internal combustion engine is an in-line type multi-cylinder engine having a single row of cylinders.

11. An exhaust system as recited in claim 1, wherein said small and said larger catalytic converters are disposed side by side on one side of said internal combustion engine, said internal combustion engine having its crankshaft directed parallel to a lengthwise direction of said vehicle, and said small catalytic converter is disposed behind said larger catalytic converter.

12. An exhaust system as recited in claim 11, wherein said internal combustion engine is an in-line type multi-cylinder engine having a single row of cylinders.

* * * * *